United States Patent [19]
Furuse et al.

[11] Patent Number: 5,207,451
[45] Date of Patent: May 4, 1993

[54] STEERING WHEEL POSITIONER FOR AUTOMATIC DRIVING POSITION SYSTEM

[75] Inventors: Takahisa Furuse; Mitsuo Yokoyama; Eisaku Hori, all of Yokohama, Japan

[73] Assignee: Jidosha Denki Kogyo Kabushiki Kaisha, Yokohama, Japan

[21] Appl. No.: 709,560

[22] Filed: Jun. 3, 1991

[30] Foreign Application Priority Data

Jun. 4, 1990 [JP] Japan .................................. 2-145790

[51] Int. Cl.⁵ .............................................. B62D 1/18
[52] U.S. Cl. .................................... 280/775; 180/271; 74/493
[58] Field of Search ................. 280/775; 74/493, 492, 74/495; 180/271

[56] References Cited
U.S. PATENT DOCUMENTS 4,934,737  6/1990  Nakatsuka ........................... 280/775
4,978,137  12/1990  Futami et al. ......................... 74/493
5,088,766  2/1992  Nakatsuka et al. .................. 280/775

*Primary Examiner*—Margaret A. Focarino
*Assistant Examiner*—Paul Dickson
*Attorney, Agent, or Firm*—Sughrue, Mion, Zinn, Macpeak & Seas

[57] ABSTRACT

A steering wheel positioner for an automatic driving position system is provided with an actuator for driving a steering wheel shaft, a tilt sensor for detecting an inclination of the steering wheel shaft, a car speed sensor, a neutral-park relay for detecting the vehicle to be stepped and a controller for memorizing a steering wheel position suitable for the driver, for driving a steering wheel to the memorized steering wheel position through the actuator, for driving the steering wheel downwardly when the tilt sensor is abnormal, and for preventing the steering wheel from driving in the downward direction when the tilt sensor is abnormal and the neutral-park delay detects the vehicle to be traveling.

7 Claims, 5 Drawing Sheets

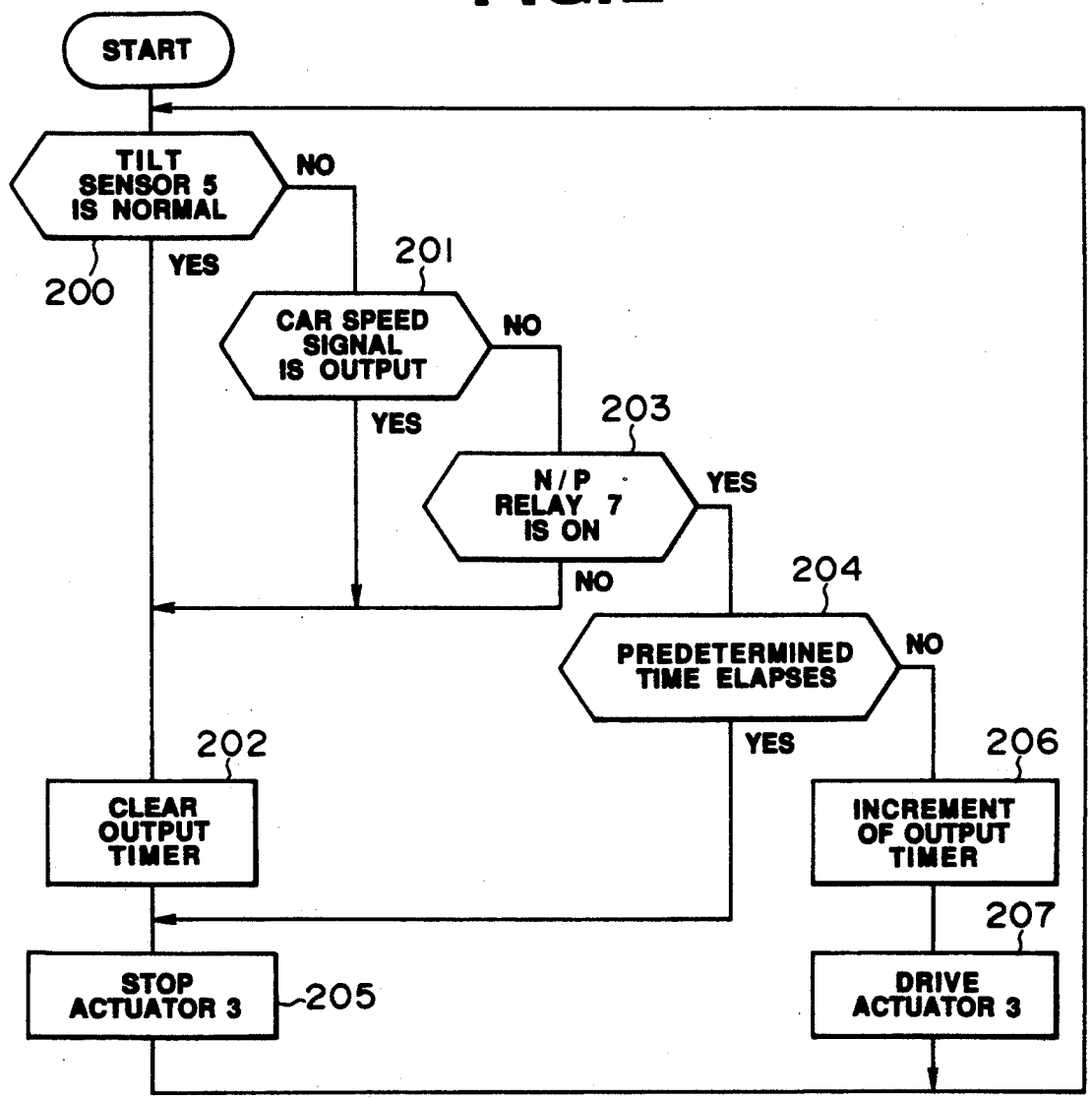

STEERING WHEEL POSITIONER FOR AUTOMATIC DRIVING POSITION SYSTEM

BACKGROUND OF THE INVENTION

1. Field of the Invention

This invention relates to a steering wheel positioner for an automatic driving position system used for adjusting a steering wheel automatically into a memorized steering wheel position suitable for respective drivers in accordance with a positioning operation of a memory switch in a motor vehicle, for example.

2. Description of the Prior Art

Heretofore, there has been used an automatic driving position system as shown in FIG. 4.

The automatic driving position system 100 illustrated in the drawing is so designed as to drive a steering wheel shaft 103 through an actuator 102 between the upper position A and the lower position B in accordance with a manual operation of a positioning switch 101.

The actuator 102 is connected with a controller 105 housed with a microcomputer, and the controller 105 is connected with a battery 106.

The controller 105 is connected with a seat-driving motor 108 for driving a seat 107 back and forth, up and down, and adjusting a reclining angle of a seat back of the seat 107, and the controller 105 is input with steering wheel position data representing an inclination angle of the steering wheel shaft 103 detected by a tilt sensor 109, seat position data detected by a seat sensor 110 and car speed data detected by a car speed sensor 111 and having pulse frequency proportional to the actual traveling speed of the vehicle through an interface circuit (not shown).

A steering wheel 104 is mounted with an air bag module 112 (air bag system) on a steering wheel hub 104a thereof so as to reduce impulsive force to be applied on the driver at the time of a frontal crash of the vehicle by expansion of the air bag module 112.

In case of memorizing the driving position suitable for the driver the steering wheel 104 is moved into the position suitable for the driver by working the actuator 102 and adjusting the inclination angle of the steering wheel shaft 103 according to the manual operation of the positioning switch 101, and the seat 107 is moved into the position suitable for the driver by working the seat-driving motor 108 in accordance with an operation of a manual switch disposed on a switch board (not shown). The microcomputer in the controller 105 memorizes the steering wheel position and the seat position suitable for the driver as the steering wheel position data representing the inclination angle of the steering wheel shaft 103 detected by the tilt sensor 109 and the seat position data detected by the seat sensor 110 by a setting operation of a set switch disposed on the switch board in this state.

After this, the steering wheel 104 and the seat 107 move automatically to the respective suitable positions memorized by the microcomputer through the actuator 102 and the seat-driving motor 108 according to a positioning operation of a memory switch disposed on the switch board.

In addition to above, the steering wheel 101 is so designed as to be driven upwardly to the highest position C (turnout position) automatically when the vehicle is stopped and an ignition key is pulled out from an ignition switch of the vehicle, for example, that the steering wheel 104 may not preclude the driver from leaving the driver's seat and sitting down in it. When the driver sits down in the driver's seat of the vehicle and inserts the ignition key into the key hole of the ignition switch, for example, the steering wheel 104 is so designed as to be returned automatically to the memorized position suitable for the driver.

In case of detecting abnormality in the tilt sensor 109 from one cause or another, the steering wheel 104 is controlled so as to be moved into the lower position B shown in FIG. 4 by working the actuator 102 to the fullest measure in the descending direction of the steering wheel shaft 103 because the tilt sensor 109 can not detect the inclination angle of the steering wheel shaft 103 and it is impossible to return the steering wheel 104 to the suitable position memorized by the microcomputer. At this time, it is not impossible to move the steering wheel 104 to the turnout position C by working the actuator 102 sufficiently in the ascending direction of the steering wheel shaft 103, however it is not possible to operate the steering wheel 104 at the turnout position C and not possible to reduce effectively the impulsive force to be applied on the driver even if the air bag module 112 works by the frontal crash of the vehicle in such a case.

If the abnormality of the tilt sensor 109 is caused when the vehicle is traveling, the controller 105 prevents the actuator 102 from driving the steering wheel shaft 103 in the downward direction while the vehicle is traveling, and shifts the steering wheel shaft 103 into the lower position B through the actuator 102 after the vehicle is stopped so as not to obstruct safety in the driving of the vehicle.

However, the aforementioned conventional automatic driving position system 100 is so structured as to Judge whether the vehicle is stopped or not by detecting existence of the car speed signal output from the car speed sensor 111, therefore the controller 105 misjudges the vehicle to be stopped when the car speed signal from the car speed sensor 111 disappears owing to disconnection or failure of the car speed sensor 111, or the vehicle speed decreases and a pulse interval of the car speed signal output from the car speed sensor 111 becomes longer.

Accordingly, there is a problem since the steering wheel shaft 103 shifts independently into, the lower position B shown in FIG. 4 even though vehicle is traveling in the cases as mentioned above.

SUMMARY OF THE INVENTION

The present invention is directed to solve the above-mentioned problem of the prior art and it is an object to provide a steering wheel positioner for an automatic driving position system which is structured so a not to shift the steering wheel shaft securely while the vehicle is traveling even if the car speed sensor gets out of order, and which improves the reliability of the system.

The construction of the steering wheel positioner for the automatic driving position system according to this invention in order to accomplish the above-mentioned object is characterized by comprising an actuator for driving a steering wheel shaft and adjusting an inclination angle of the steering wheel shaft, a tilt sensor for detecting the inclination angle of the steering wheel shaft, a car speed sensor for sensing a traveling speed of a vehicle, a vehicle condition detecting means for detecting whether the vehicle is stopped or not, and a control means which memorizes a position of the steering wheel shaft detected by the tilt sensor as the inclination angle of the steering wheel shaft at the time of operating a set switch and drives the steering wheel shaft to the memorized position through the actuator in response to an operation of a memory switch, and which drives the steering wheel shaft downwardly through the actuator when output from the tilt sensor is abnormal and prevents the driving of the steering wheel shaft in the downward direction when the output from the tilt sensor is abnormal and the vehicle condition detecting means detects the vehicle to be in traveling. In preferred aspects according to this invention, a neutral/parking relay for detecting a shift lever to be in a neutral or parking position, a detent switch or a P range switch for detecting a shift lever to be in a parking position, or a rotational sensor for detecting rotation of an engine may be used as the vehicle condition detecting means.

In the steering wheel positioner for the automatic driving position system according to this invention, the controller prevents the driving of the steering wheel into the lower position B by judging the stoppage of the vehicle according to outputs from not only the car speed sensor but also the vehicle condition detecting means. Therefore the controller never misjudges whether the vehicle is stopped or not even if the car speed sensor gets out of order or the vehicle travels at a low speed, and the steering wheel shaft is driven to the lower position B by the actuator after the vehicle is stopped positively.

BRIEF DESCRIPTION OF THE DRAWINGS

FIG. 2 is a flowchart showing the control by the controller of the automatic driving position system shown in FIG. 1.

DESCRIPTION OF THE PREFERRED EMBODIMENT

Figure 1:
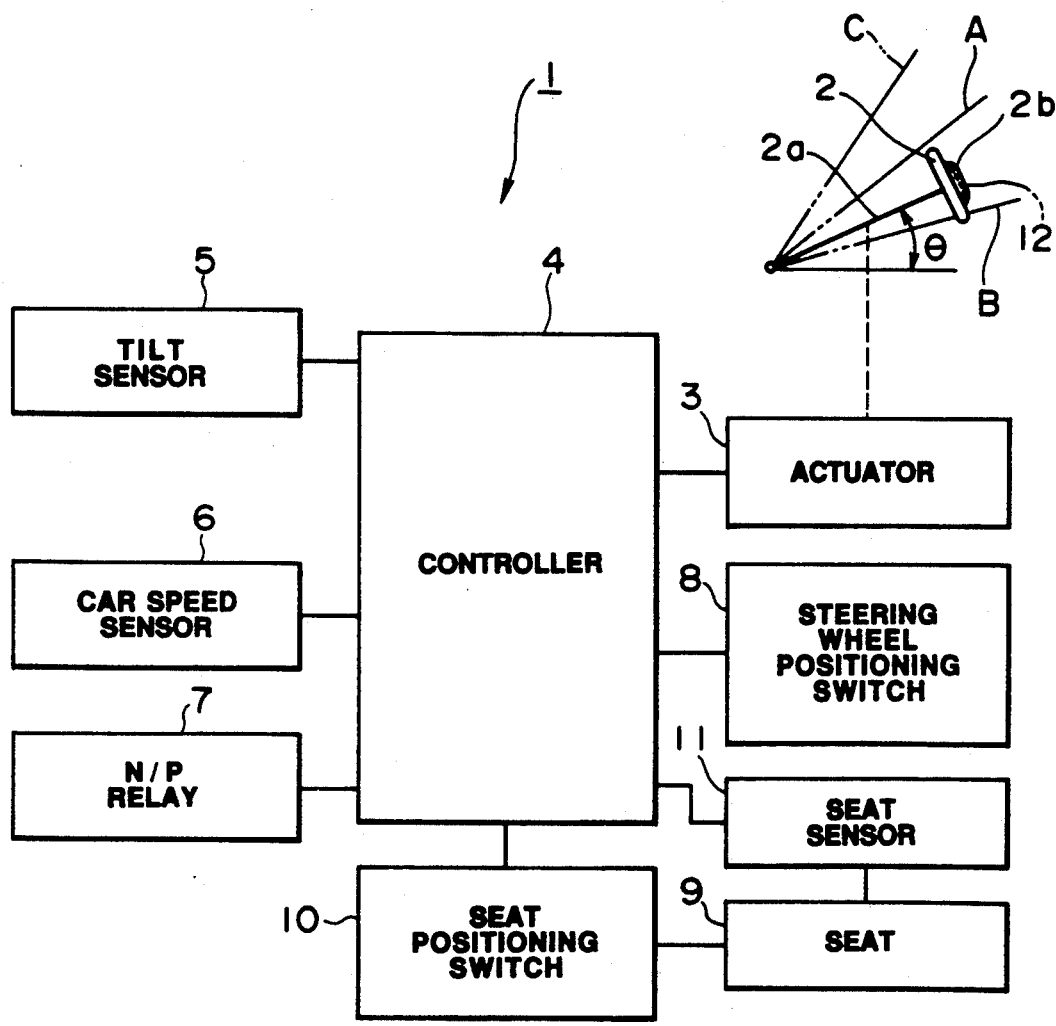
FIG. 1 is a block diagram showing the configuration of the automatic driving position system provided with the steering wheel positioner according to an embodiment of this invention.

A steering wheel positioner for an automatic driving position system according to an embodiment of this invention will be explained below on basis of FIG. 1 to FIGS. 3A and 3B.

The automatic driving position system 1 shown in the figures is provided with an actuator 3 for driving a steering wheel shaft 2a and moving a steering wheel 2 adjusting an inclination angle $\theta$ of the steering wheel shaft 2a, and the actuator 3 is connected to a controller 4. The controller 4 is connected with a tilt sensor 5 for detecting the inclination angle $\theta$ of the steering wheel shaft 2a and outputting a signal as steering wheel position data.

The controller 4, which is housed with an I/O interface circuit (not shown) and a microcomputer (not shown) connected to the I/O interface circuit, is connected with a car speed sensor 6 for detecting a vehicle speed and outputting a signal as car speed data having pulse frequency proportional to the actual traveling speed of the vehicle, and connected with a neutral/parking relay (N/P relay) 7 which is a vehicle condition detecting means for detecting whether the vehicle is stopped or not and outputting a signal as vehicle condition data.

The controller 4 is also connected with a steering wheel positioning switch 8 to be operated for driving the actuator 3, a seat positioning switch 10 to be operated for driving a seat-driving motor (not shown) disposed in a seat 9 and a seat sensor 11 for detecting a seat position and outputting a signal as seat position data.

The controller 4 is provided with a switch board (not shown) disposed with a set switch and a memory switch to be operated for memorizing the seat and steering wheel positions suitable for the driver and returning the seat 6 and steering wheel 2 into the suitable positions memorized by the microcomputer, respectively, and a output timer (not shown). Further, the controller 4 is so structured as to be input with the steering wheel position data output from the tilt sensor 5, the car speed data output from the car speed sensor 6, the vehicle condition data output from the N/P relay 7 and the seat position data output from the seat sensor 11.

Additionally, the steering wheel 2 is disposed with an air bag module 12 (air bag system) on a steering wheel hub 2b thereof in order to actuate (expansion) the air bag system 12 and reduce the implusive force to be applied on the driver at the time of a crash.

In case of memorizing the driving position suitable for the driver, the steering wheel 2 is moved into the position suitable for the driver by working the actuator 3 according to the manual operation of the steering wheel positioning switch 8 and the seat 9 is moved into the position suitable for the driver by working the seat-driving motor in accordance with the manual operation of the seat positioning switch 10.

In this state, by the setting operation of the set switch on the switch board (not shown), the suitable steering wheel position is memorized by the microcomputer in the controller 4 as the steering wheel position data detected by the tilt sensor 5 and the suitable seat position is memorized similarly by the microcomputer as the seat position data detected by the seat sensor 11.

After this, by the positioning operation of the memory switch on the switch board, the steering wheel 2 and the seat 9 return automatically to the respective suitable positions memorized by the microcomputer even if they are sited elsewhere.

The steering wheel 2 is also controlled so as to be moved automatically into the highest position C(turn-out position) by driving the steering wheel shaft 2a upwardly through the actuator 3 so that the steering wheel 2 may not interfere with the driver at the time of leaving or taking the driver's seat on the vehicle when the vehicle is stopped and an ignition key is drawn out from an ignition switch of the vehicle, for example. When the driver sits down in the driver's seat and inserts the ignition key into the key hole of the ignition switch, the steering wheel 2 is so designed as to be returned automatically to the memorized position suitable for the driver.

If the abnormality is detected in the tilt sensor 5, the steering wheel 2 is controlled to be shifted to the lower position B by working the actuator 3 for a time sufficient to drive the steering wheel shaft 2a as far as the lower position B, but the controller 4 prevents the actuator 3 from driving drive the steering wheel shaft 2a while the vehicle is traveling by executing the control shown in FIG. 2. The steering wheel 2 is controlled so as to be shifted to the lower position B after the vehicle is stopped positively as shown in FIGS. 3A and 3B.

Namely, the program starts by connecting with a power source (not shown), in step 200, judgement is done as to whether the tilt sensor 5 is normal or not In this step, the output level of the steering wheel position data input in the controller 4 from the tilt sensor 5 is checked up, and the sensor 5 is judged to be normal when the output level from the tilt sensor 5 is within a proper range and judged to be abnormal if the output level is out of the proper range.

When the tilt sensor 5 is Judged to be normal (YBS) in stop 200, the output timer of the controller 4 is cleared at step 202, and the power supply to the actuator 3 is cut at step 205, thereby preventing the driving of the steering wheel shaft 2a by the actuator 3 and control returns to step 200.

If the tilt sensor 5 is judged to be abnormal (NO) in step 200, judgement is done as to whether the car speed signal is output or not from the car speed sensor 6 at succeeding step 201.

When the car is traveling or the car speed sensor 6 outputs the car speed signal at step 201 (YBS), the controller 4 judges the vehicle to be traveling and prevents the driving of the steering wheel shaft 2a by the actuator 3 at step 205 after clearing the output timer at step 202, so that the steering wheel 2 is kept at the present position and then control returns to step 200.

If the car is not traveling or the car speed sensor 6 does not output the car speed signal at step 201 (NO), control proceeds to step 203 and Judgement is done as to whether the N/P relay 7 is ON or not.

When the N/P relay 7 is not ON (NO) at step 203, the controller 4 judges the vehicle to be traveling even if the car speed signal is not output from the car speed sensor 6 (in this case, it is possible to consider that the vehicle is travelling at a low speed or the car speed sensor 6 gets out of order), and the steering wheel 2 is kept at the present position by executing the processes of step 202 and step 205 as described above.

If the N/P relay 7 is ON (YBS) at step 203, control proceeds to step 204 and Judgement is done as to whether time set by the output timer of the controller 1 elapses or not at step 204, namely the Judgement is done in this step as to whether or not the actuator 3 is driven for a time sufficient to drive the steering wheel shaft 2a to the lower position B.

The judgement is done that the predetermined time does not elapse at step 204, control proceeds to step 207 and the actuator 3 is worked in order to drive the steering wheel shaft 2a in the downward direction after the increment of the output timer at step 206 because the predetermined time set by the output timer does not elapse in the early stage of the execution of step 201. Namely, the controller 4 does not judge the vehicle to be stopped until the N/P relay 7 comes into ON state at step 203.

Control returns to step 200, the steering wheel shaft 2a continues to be driven by the actuator 3 for the predetermined time and arrives in the lower position B after repeating the processes of steps 206 and 207.

When judgement is done that the predetermined time set by the output timer in the controller 4 elapses at step 204 (YBS), the controller 4 considers that the steering wheel 2 arrives in the lower position B and prevents the actuator 3 from driving the steering wheel shaft 2a at step 205, and then control returns to step 200.

Next, the aforementioned control will be explained with reference to the time charts shown in FIGS. 3A and 3B.

As shown in FIG. 3A, when the tilt sensor 5 gets out of order at the time shown with a symbol "▲" in the figure while the vehicle is traveling (in this time, the car speed sensor 6 is outputting the car speed signal and the N/P relay 7 is also outputting the vehicle condition data showing the vehicle to be raveling), the controller 4 works the actuator 3 to drive the steering wheel shaft 2a in the downward direction only after judging the vehicle to be stopped at the time shown with a symbol "★" in this figure according to the vehicle condition data output from the N/P relay 7 showing the vehicle to be parked even if the car speed signal disappears previously for some reason such as trouble or the like.

Also in case where the car speed signal is not output from the beginning owing to the trouble of the car speed sensor 6, for example, as shown in FIG. 3B (in this case, the steering wheel 2 is controlled into the memorized position suitable for the driver so long as the tilt sensor 5 is normal and possible to detect the inclination angle $\theta$ of the steering wheel shaft 2a), the steering wheel 2 is not shifted until the controller 4 judges that the vehicle is stopped at the time shown the symbol "★" according to the vehicle condition data from the N/P relay 7 even if the tilt sensor 5 gets out of order at the time shown with the symbol "▲" in the figure previous to the stoppage of the vehicle.

Figure 2A:
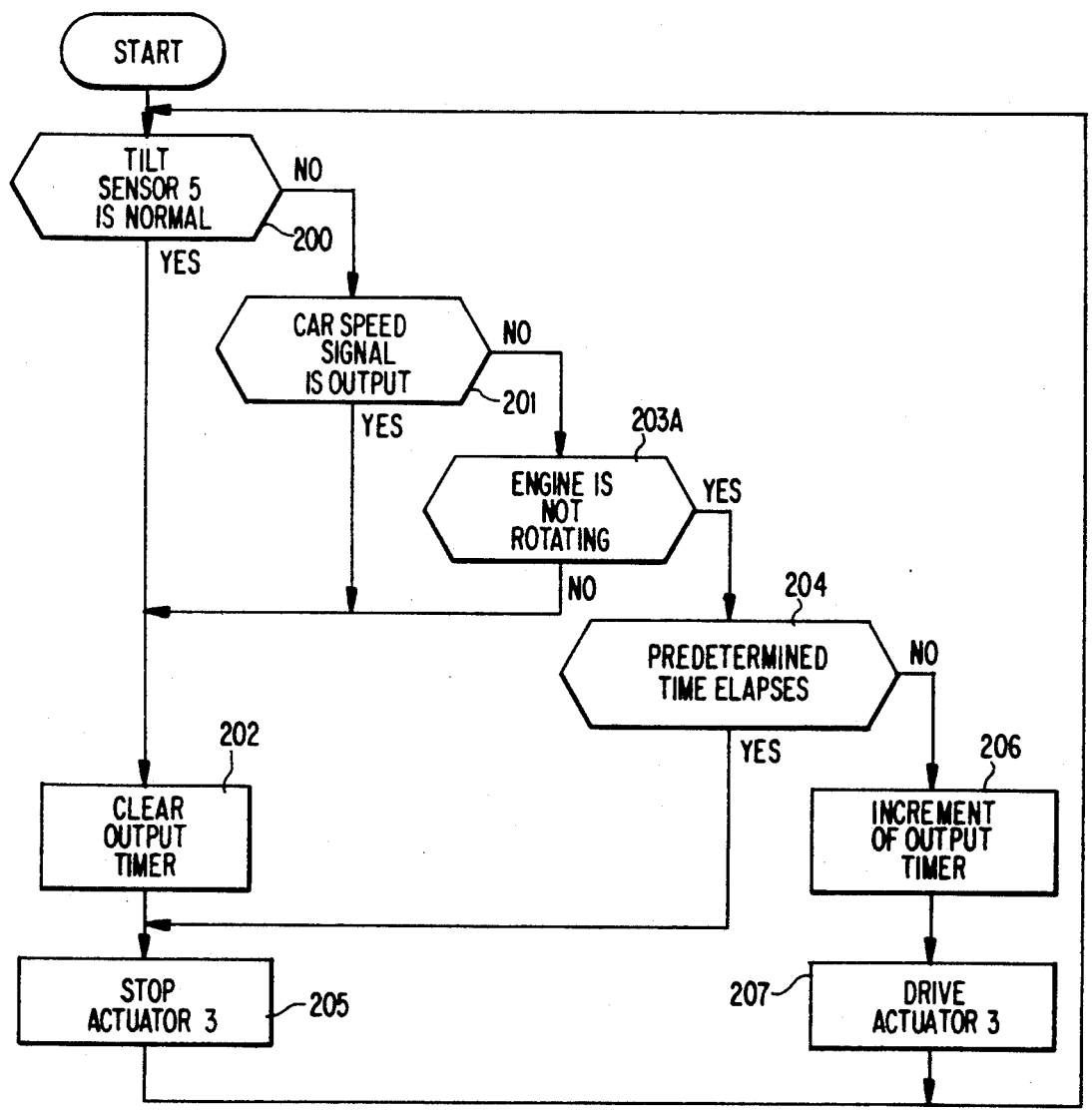
FIG. 2A is a flowchart similar to FIG. 2 but with an engine rotation step as a vehicle condition detecting means.
Figure 3A:
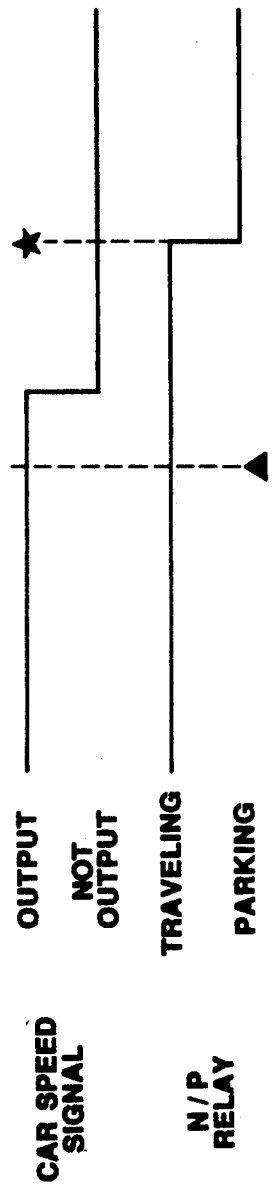
FIGS. 3A and 3B are time charts illustrating the timing of the control by the controller of the automatic driving position system shown in FIG. 1.
Figure 3B:
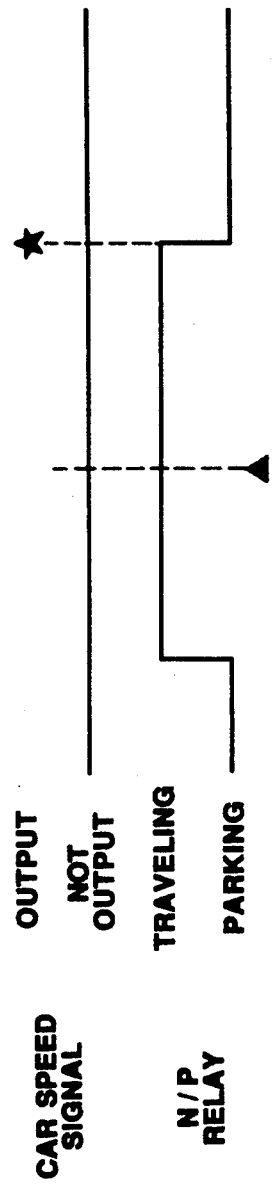
Figure 4:
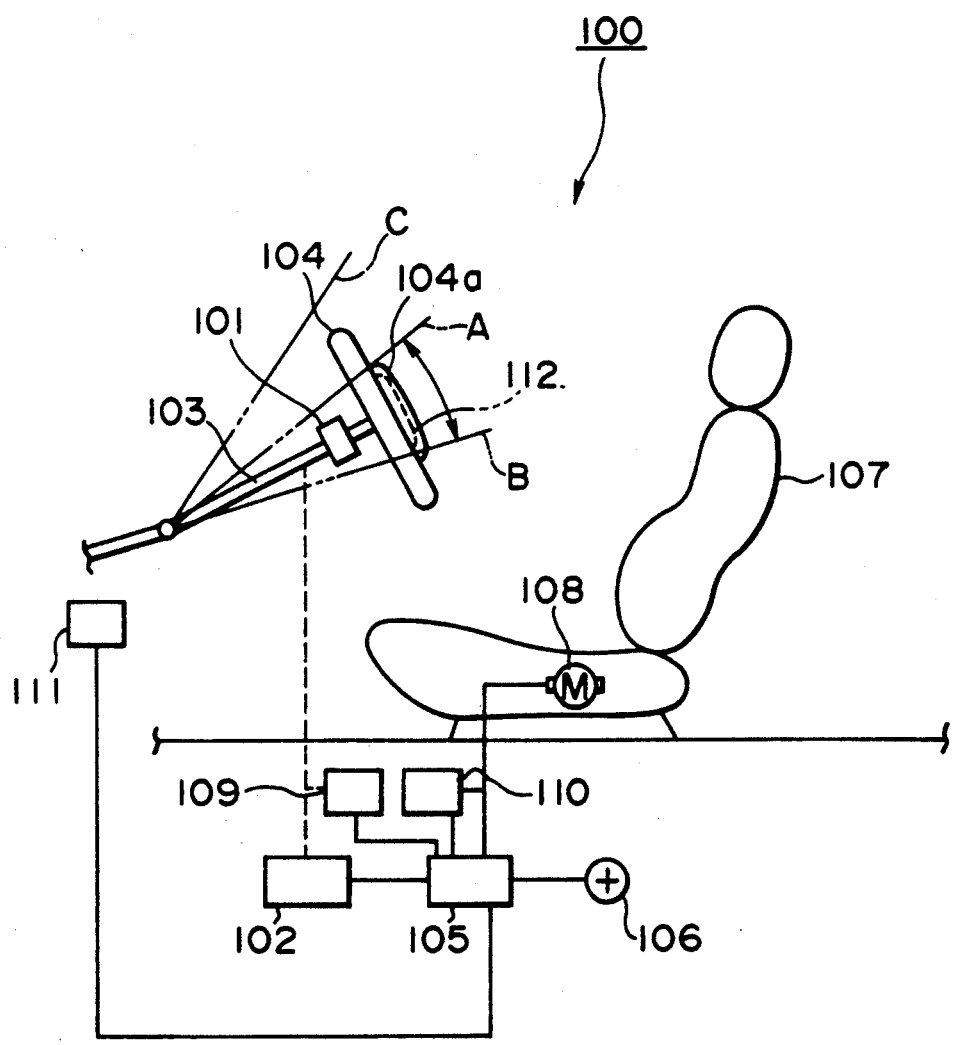
FIG. 4 is a schematic representation of the conventional automatic driving position system.

Although the N/P relay is exemplified as the vehicle condition detecting means in this embodiment, a detent switch or a P range switch for detecting the shift lever to be in the parking position, or a rotational sensor for detecting rotation of an engine may be used in place of the N/P relay as the vehicle condition detecting means (see FIG. 2A, step 203A).

The detent switch and the P range switch are so designed as to be made into the OFF-state by shifting the shift lever into the parking position, and possible to detect the vehicle to be stopped by sensing the shift lever sitting in the parking position and rotational sensor is possible to detect the vehicle to be stopped by sensing the stoppage of the engine.

As described above, the steering wheel positioner for the automatic driving position system according to this invention comprises an actuator for driving a steering wheel shaft and adjusting an inclination angle of the steering wheel shaft, a tilt sensor for detecting the inclination angle of the steering wheel shaft, a car speed sensor for detecting a traveling speed of a vehicle, a vehicle condition detecting means for detecting whether the vehicle is stopped or not, and a control means which memorizes a position of the steering wheel shaft detected by the tilt sensor as the inclination angle of the steering wheel shaft at the time of operating a set switch and drives the steering wheel shaft to the memorized position through the actuator in response to an operation of a memory switch, and which drives the steering wheel shaft downwardly through the actuator when output from the tilt sensor is abnormal and prevents the driving of the steering wheel shaft in the downward direction when the output from the tilt sensor is abnormal and the vehicle condition detecting means detects the vehicle to be in traveling. Therefore, an excellent effect can be obtained in that it is possible to improve the safety of the driving and the reliability of the automatic driving position system because the steering wheel is never shifted until the vehicle is stopped positively even if the car speed sensor breaks down.

What is claimed is:

1. A steering wheel positioner for an automatic driving position system for a vehicle with a tiltable steering wheel comprising:
    an actuator for driving a steering wheel shaft of the tiltable steering wheel of the vehicle and for adjusting an inclination angle of the steering wheel shaft of the tiltable steering wheel of the vehicle;
    a tilt sensor for detecting the inclination angle of the steering wheel shaft of the tiltable steering wheel of the vehicle and for generating a position signal of the tiltable steering wheel of the vehicle;
    a speed sensor provided on the vehicle for detecting the traveling speed of the vehicle for generating a traveling speed signal of the vehicle when the vehicle is traveling;
    vehicle condition detecting means for detecting whether the vehicle is traveling for generating a traveling signal of the vehicle;
    switching means having a setting switch and a memory switch;
    control means connected with said actuator, said tilt sensor, said speed sensor, said vehicle condition detecting means and switching means;
    said control means including:
    memory means for memorizing the inclination angle of the steering wheel shaft of the tiltable steering wheel of the vehicle detected by said tilt sensor in response to the operation of the setting switch of said switching means;
    first driving means for driving the steering wheel shaft of the tiltable steering wheel of the vehicle to the inclination angle memorized in the memory means through said actuator in response to the operation of the memory switch of said switching means;
    judgement means for detecting an abnormal state of said tilt sensor and for generating a signal indicating the abnormal state of said tilt sensor;
    second driving means for driving the steering wheel shaft of the tiltable steering wheel of the vehicle downwardly through said actuator in response to the signal indicating the abnormal state of said tilt sensor; and
    prohibiting means responsive to the travelling speed signal from the speed sensor or the travelling signal from the vehicle condition detecting means when the travelling speed signal from the speed sensor is not output for generating a preventing signal preventing said second driving means from driving downwardly the steering wheel shaft of the tiltable steering wheel of the vehicle.

2. A steering wheel positioner for an automatic driving position system as set forth in claim 1, wherein said control means further includes timer means for counting a predetermined time to drive the steering wheel shaft of the tiltable steering wheel of the vehicle downwardly by said second driving means.

3. A steering wheel positioner for an automatic driving position system as set forth in claim 1, wherein said vehicle condition detecting means is a neutral/parking relay for detecting a shift lever in a neutral or parking position.

4. A steering wheel positioner for an automatic driving position system as set forth in claim 1, wherein said vehicle condition detecting means is a detect switch for detecting a shift lever to be in a parking position.

5. A steering wheel positioner of an automatic driving position system as set forth in claim 1, wherein said vehicle condition detecting means is a parking range switch for detecting a shift lever to be in a parking position.

6. A steering wheel positioner for an automatic driving position system as set forth in claim 1, wherein said vehicle condition detecting means is a rotational sensor for detecting rotation of an engine.

7. A steering wheel positioner of an automatic driving position system for a vehicle with a tiltable steering wheel comprising:
    an actuator for driving a steering wheel shaft of the tiltable steering wheel of the vehicle and for adjusting an inclination angle of the steering wheel shaft of the tiltable steering wheel of the vehicle;
    a tilt sensor for detecting the inclination angle of the steering wheel shaft of the tiltable steering wheel of the vehicle and for generating a position signal of the tiltable steering wheel of the vehicle;
    a speed sensor provided on the vehicle for detecting the traveling speed of the vehicle for generating a traveling speed signal of the vehicle when the vehicle is traveling;
    a rotational sensor for detecting whether the vehicle is working by sensing rotation of an engine and for generating a working signal of the vehicle;
    switching means having a setting switch and a memory switch;
    control means connected with said actuator, said tilt sensor, said speed sensor, said rotational sensor and said switching means;
    said control means including:
    memory means for memorizing the inclination angle of the steering wheel shaft of the tiltable steering wheel of the vehicle detected by said tilt sensor in response to the operation of the setting switch of said switching means;
    first driving means for driving the steering wheel shaft of the tiltable steering wheel of the vehicle to the inclination angle memorized in the memory means through said actuator in response to the operation of the memory switch of said switching means;
    judgement means for detecting an abnormal state of said tilt sensor and for generating a signal indicating the abnormal state of said tilt sensor;
    second driving means for driving the steering wheel shaft of the tiltable steering wheel of the vehicle downwardly through said actuator in response to the signal indicating the abnormal state of said tilt sensor;
    timer means for counting a predetermined time to drive the steering wheel shaft of the tiltable steering wheel of the vehicle downwardly by said second driving means; and prohibiting means responsive to the travelling speed signal from the speed sensor or the working signal from the rotational sensor when the travelling speed signal from the speed sensor is not output for generating a preventing signal preventing said second driving means from driving downwardly the steering wheel shaft of the tiltable steering wheel of the vehicle.

* * * * *